(12) United States Patent
LaMarca et al.

(10) Patent No.: US 6,447,028 B1
(45) Date of Patent: Sep. 10, 2002

(54) JOINT FITTING

(75) Inventors: Drew P. LaMarca, Whippany; Gennaro A. Barile, Secaucus, both of NJ (US)

(73) Assignee: Asco Controls, L.P., Florham Park, NJ (US)

( * ) Notice: Subject to any disclaimer, the term of this patent is extended or adjusted under 35 U.S.C. 154(b) by 25 days.

(21) Appl. No.: 09/641,360

(22) Filed: Aug. 18, 2000

(51) Int. Cl.[7] .................... F16L 21/00; F16L 37/24
(52) U.S. Cl. .................... 285/404; 285/82; 285/83; 285/90; 285/123.13; 285/335; 285/399; 285/403; 285/918
(58) Field of Search ................ 285/404, 403, 285/399, 335, 90, 82, 83, 123.13, 918

(56) References Cited

U.S. PATENT DOCUMENTS

| | | | | |
|---|---|---|---|---|
| ,025,283 A | * | 8/1859 | Smith .................. 285/360 |
| ,258,794 A | * | 5/1882 | Moss .................. 285/302 |
| ,696,316 A | * | 3/1902 | Corbin ................ 285/148.6 |
| ,804,992 A | * | 11/1905 | Anderson .............. 285/325 |
| 1,254,375 A | * | 1/1918 | Thompson .............. 285/90 |
| 1,460,154 A | * | 6/1923 | Frazier et al. ........ 285/98 |
| 1,778,739 A | * | 10/1930 | Wheaton .............. 285/82 |
| 1,829,101 A | * | 10/1931 | McGeorge ............. 285/90 |
| 2,146,100 A | * | 2/1939 | Walch ................. 417/151 |
| 2,329,198 A | * | 9/1943 | Hattan et al. ......... 285/251 |
| 2,459,981 A | * | 1/1949 | Warren ............... 285/111 |
| 2,467,911 A | * | 4/1949 | Reilly ............... 285/302 |
| 2,521,127 A | * | 9/1950 | Price ................ 285/231 |
| 2,655,391 A | * | 10/1953 | Atkins ............... 285/275 |
| 2,726,104 A | * | 12/1955 | Boitnott et al. ...... 285/98 |
| 2,833,568 A | * | 5/1958 | Corsette ............. 285/281 |
| 2,984,811 A | * | 5/1961 | Hennessey, Jr. et al. ... 439/153 |
| 3,011,803 A | * | 12/1961 | Buckner et al. ....... 285/23 |
| 3,343,852 A | * | 9/1967 | Blight et al. ........ 285/82 |
| 3,504,935 A | * | 4/1970 | Gullihur ............. 285/14 |
| 3,885,818 A | * | 5/1975 | Ammann .............. 285/31 |
| 3,941,410 A | * | 3/1976 | Miyaoka ............. 285/321 |
| 3,979,814 A | | 9/1976 | Lajoie et al. ........ 29/272 |
| 4,018,462 A | | 4/1977 | Saka ................. 285/111 |

(List continued on next page.)

OTHER PUBLICATIONS

UL 886 Standards for Safety, Understiters Laboratories Inc., Jun. 12, 1985 (62 pages).
UL 1002, Standards for Safety, Underwriters Laboratories Inc., Aug. 23, 1988 (17 pages).
NEMA 1CS6, Industrial Control and Systems: Enclosures, ©1994 National Electrical Manufacturers Association (24 pages).
Thomas Products® Internet Pages, 08/08/00 (3 pages).
NEMA Electrical Enclosure Types Internet page, 08/08/00 (1 page).
National Electrical Code, Article 501–5 ©1999 NFPA.
International Search Report, Feb. 14, 2002, for foreign counterpart PCT application PCT/USO1/25916.

*Primary Examiner*—J. J. Swann
*Assistant Examiner*—Carlos Lugo
(74) *Attorney, Agent, or Firm*—Howrey Simon Arnold & White, LLP (57) ABSTRACT

A fitting for connecting two components is described. The fitting may be explosion proof for use in hazardous environments. The fitting may swivel allowing fast and easy connection to fixed components, thus minimizing the time required for installation and periodic maintenance, while maintaining the integrity of the explosion proof fitting. In this way, components—such as electrical conduits containing conductors or wires—can be installed and maintained without the use of damming material. Also described is a method of installing an explosion proof fitting for use in hazardous environments.

46 Claims, 8 Drawing Sheets

U.S. PATENT DOCUMENTS

| | | | |
|---|---|---|---|
| 4,031,340 A | | 6/1977 | Pastorel ........................ 200/50 |
| 4,109,990 A | * | 8/1978 | Waldron et al. ............... 339/89 |
| 4,244,554 A | | 1/1981 | DiMauro et al. ........... 251/61.1 |
| 4,268,103 A | * | 5/1981 | Schildkraut et al. .......... 339/89 |
| 4,462,653 A | * | 7/1984 | Flederbach et al. ........... 339/89 |
| 4,606,557 A | * | 8/1986 | Coffey .......................... 285/18 |
| 4,725,082 A | * | 2/1988 | Burkett ....................... 285/348 |
| 4,840,194 A | | 6/1989 | Berry ......................... 138/155 |
| 4,921,208 A | | 5/1990 | LaMarca ................. 251/30.04 |
| 5,165,729 A | * | 11/1992 | Masseth et al. ............... 285/39 |
| 5,212,624 A | | 5/1993 | Johnson et al. ............. 361/357 |
| 5,228,721 A | | 7/1993 | Whittle et al. ................. 285/23 |
| 5,294,089 A | | 3/1994 | LaMarca ................. 251/30.02 |
| 5,431,456 A | | 7/1995 | Okumura et al. ........... 285/156 |
| 5,433,489 A | | 7/1995 | Kumura et al. ............. 285/220 |
| 5,443,291 A | | 8/1995 | Stucchi et al. .............. 285/316 |
| 5,480,311 A | | 1/1996 | Luu ........................... 439/100 |
| 5,538,220 A | | 7/1996 | LaMarca ............... 251/129.15 |
| 5,904,377 A | | 5/1999 | Throup ........................ 285/39 |
| 5,918,852 A | | 7/1999 | Otto ........................ 251/30.04 |
| 6,003,552 A | | 12/1999 | Shank et al. ........... 137/625.44 |
| 6,044,791 A | | 4/2000 | LaMarca et al. ............. 116/277 |

\* cited by examiner

JOINT FITTING

BACKGROUND OF THE INVENTION

1. Field of the Invention

The present invention relates to a fitting for connecting two components. More particularly, this invention relates to an explosion proof fitting to join two electrical components, such as electrical conduits.

2. Description of the Related Art

In the workplace, it is often necessary to run electrical conductors or wires in hazardous environments. Hazards are created by the possible presence of ignitable quantities of flammable liquids, gases, vapors, combustible dusts, or ignitable fibers. Examples of hazardous work environments include, but are not limited to, locations where volatile flammable liquids are transferred from one container to another; interiors of spray booths; in the vicinity of spray painting operations where volatile flammable solvents are used; locations where dangerous concentrations of suspended dust are likely, such as in grain elevators; and gasoline fueling stations.

Hazardous locations require specially designed electrical equipment to protect against increased fire potential. To run the electrical conductors or wires through these hazardous workplaces, the conductors or wires are encased in electrical conduits. Among other things, the conduit prevents an electrical short, arcing, or intense heat from escaping into the flammable atmosphere causing a fire. Further, fittings connecting these electrical conduits in a hazardous workplace must be "explosion proof." Multiple standards—such as in Article 501, Section 501-5 of the National Electric Code; National Electrical Manufacturers Association ("NEMA") ICS 6-1993 (entitled "Enclosures") and NEMA Classes 4–13; American National Standards Institute ("ANSI"); and UNDERWRITER'S LABORATORIES INC., UL 886 and 1002—govern explosion proof electrical components for use in hazardous environments. By utilizing properly installed and maintained explosion proof equipment, intense heat or an arc inside the electrical conduits or components will not ignite the dangerous atmosphere surrounding them.

Many of the components in an electrical system, such as solenoids, require routine periodic maintenance. As such, it is desired that a fitting be quickly, simply; and easily installed and removed, but still maintain the explosion proof connection.

Further, some of the conduits in an electrical system may be permanently mounted at a location. Therefore, it may not be possible to rotate one conduit to attach it to the fitting or to another conduit. Thus, there is a need for an explosion proof fitting that is capable of quickly and easily attaching two conduits, even when one conduit or both conduits cannot rotate. This is especially true in electrical systems having components requiring periodic maintenance.

U.S. Pat. No. 3,979,814 to Lajoie et al., entitled "Pipe Fitting Device," describes a clamp for quickly attaching one conduit to another. Further, U.S. Pat. No. 4,018,462 to Saka, entitled "Pipe Fitting," describes sealing one conduit onto another by deforming one portion of a conduit. However, these simple and relatively quick methods for connecting two conduits are inappropriate for use in a hazardous environment as they may not seal the conduits sufficiently to prevent a flame caused by an arc from reaching the surrounding atmosphere.

U.S. Pat. No. 4,840,194 to Berry describes a sealing fitting having four sub-elements to connect two electrical conduits. The Berry fitting is sealed, and thus made explosion proof, by sealing the fittings with damming material. However, the inclusion of the damming material has been found to be an imprecise art, especially in light of the numerous voids which must be sealed as described in Berry. Further, re-use of the Berry fitting requires the fitting to be deconstructed and cleaned before re-use. It has been found that this type of arrangement may increase the cost and time to complete routine maintenance of the connected components. Finally, aligning the four different fitting components is not easy to perform in the field, thus increasing the time and cost of performing routine maintenance on an electrical system.

SUMMARY OF THE INVENTION

In one embodiment of the present invention, a fitting for connecting a first component to a second component is provided. The fitting comprises a bushing having a threaded end for threadedly engaging the first component, and a smooth male end having an outer diameter. An adapter is described as having a threaded end for threadedly engaging the second component, and a female collar end. The adapter has an inside diameter and receives the smooth male end of the bushing. The adapter also has a locking mechanism to connect the adapter to the bushing when the smooth male end of the bushing is inserted into the adapter. The outer diameter of the bushing is in close communication with the inner diameter of the adapter to define a flame path to produce an explosion proof fitting. In some embodiments, the locking mechanism further comprises a groove. The grove is formed along an outer perimeter of the bushing. A screw having a tip may be radially inserted through the collar of the adapter. The tip of the screw mates with the groove of the bushing to allow the adapter to rotate about the bushing. In some embodiments, the tip of the screw is screwed into to the groove to rigidly attach the adapter to the bushing.

In other embodiments, a method of connecting a first component to a second component is described. The method comprises providing a fitting for connecting a first component to a second component, the fitting having the features described above. The method includes rotating the bushing to threadedly engage the fitting to the first component. The method also includes rotating the adapter to threadedly engage the fitting to the second component.

In other aspects, a fitting is described for connecting a first component to a second component. The fitting comprise a bushing having a threaded end for threadedly engaging the first component and a smooth male end having an outer diameter. An adapter is described having a threaded end for threadedly engaging the second component. The adapter also has a female collar end and an inside diameter. The adapter receives the smooth male end of the bushing. The adapter also has a locking mechanism to connect the adapter to the bushing when the smooth male end of the bushing is inserted into the adapter.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents, and alternatives falling within the spirit and scope of the invention as defined by the appended claims.

DESCRIPTION OF ILLUSTRATIVE EMBODIMENTS

The invention relates to a fitting and a method for connecting a first component, such as an electrical conduit, to another component, such as another electrical conduit. In some embodiments of the present invention, the bushing, adapter, and a locking mechanism are provided. The bushing has a threaded end to engage the first component, and the adapter has a threaded end to engage the second component. The adapter also has a female collar end with an inside diameter for receiving the smooth male end of the bushing, which has an outer diameter. In these embodiments, the collar typically has a locking mechanism to axially connect the adapter to the bushing, but still allowing rotational movement between the bushing and the adapter. In this way, the fitting may be installed quickly and easily to components which are fixed, i.e. incapable of rotation. Further, as the smooth male end of the bushing is inserted into the adapter, a flame path is defined sufficient to produce an explosion proof fitting. In this way, installation and maintenance of various components of an electrical system may be performed, while still meeting explosion proof requirements of various standards. Further, because the installation and removal of the fitting may be performed without the use of damming material to fill gaps in the fitting, installation and removal may be repeatedly performed without degrading the integrity of the explosion proof status of the fitting. This allows for quicker and easier maintenance of an electrical system than fittings currently known.

Various locking mechanisms may be used with the present invention which provide versatility to provide an explosion proof fitting. Further, the use of gaskets is described, thus making the explosion proof fitting capable of use in a water tight environment, or for use with the flow of explosive fluids.

Wrench lands and hexagonal stops are described to which wrenches may be attached to further facility the fitting installation and fitting removal process, thus reducing the time and cost associated with the installation and maintenance of various components.

In each of the various embodiments of the present invention, the advantage of using an easy-to-install and remove explosion proof fitting is utilized. Thus, the cost and time associated with installation and maintenance of electrical systems is reduced.

Illustrative embodiments of the invention are described below as they might be employed to connect one component, such as an electrical conduit, to another. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings. Each component shown in the following figures may be comprised of stainless steel or other suitable material and manufactured in accordance with ANSI B 18.6.7 M, for example. Generally, fitting surfaces have an average roughness of not more that 250 microinches in accordance with Standard for Surface Texture, ANSI B46.1-1978.

Figure 1A:
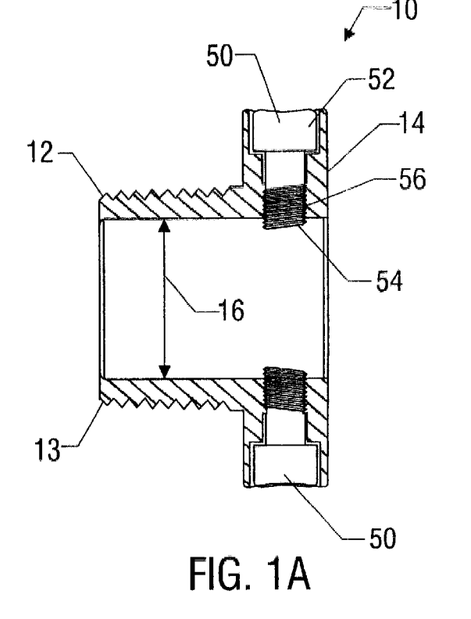
FIGS. 1A–C show the side, front, and perspective views of the adapter of one embodiment of the present invention.
Figure 1B:
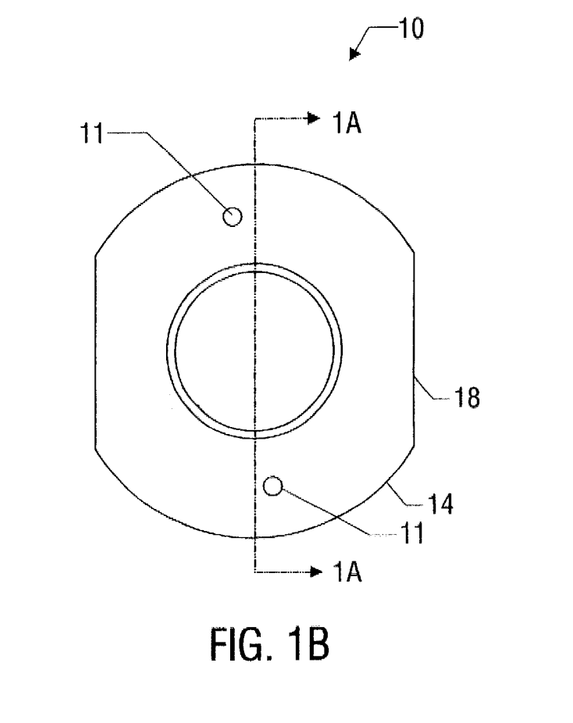
Figure 1C:
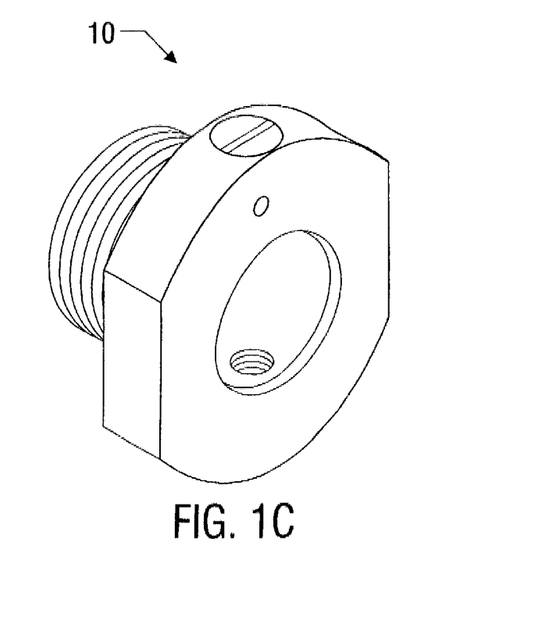
Figure 2A:
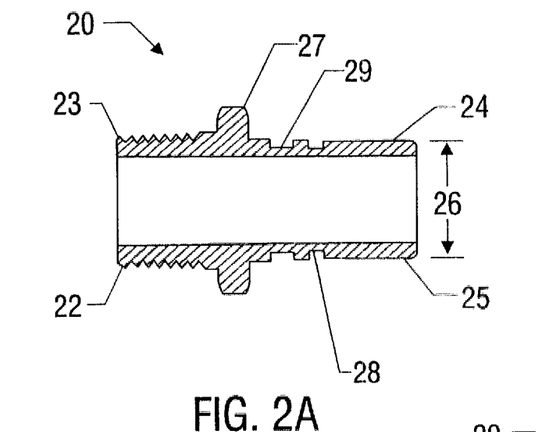
FIGS. 2A–D show the side, cut away side, front, and perspective views of a bushing of one embodiment of the present invention.
Figure 2B:
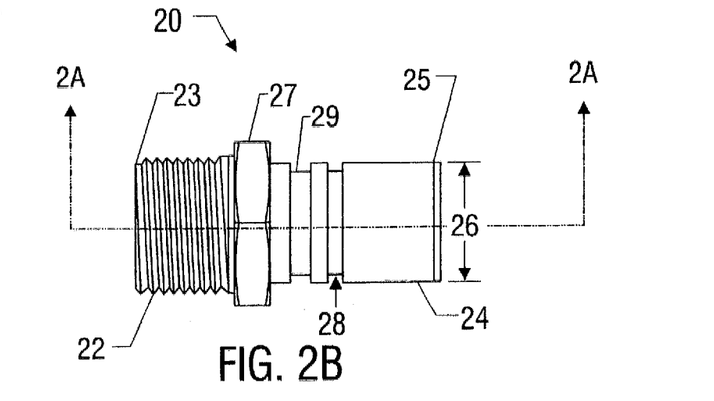
Figure 2C:
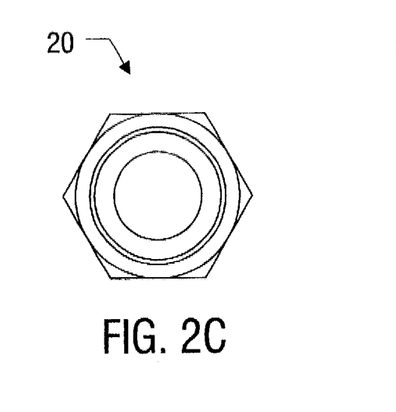
Figure 2D:
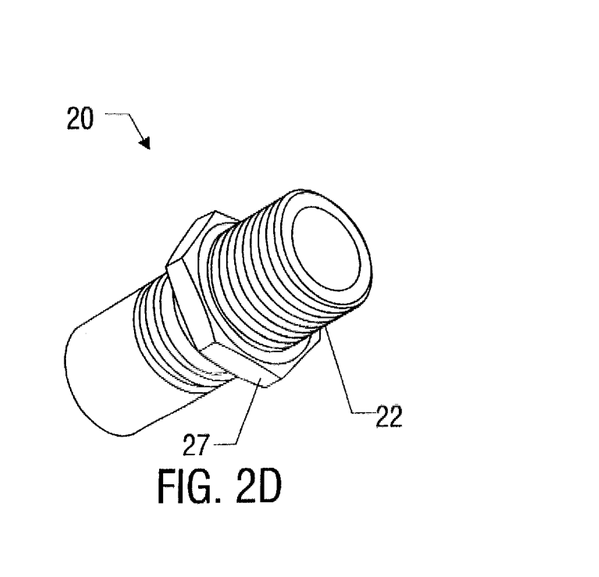

Referring to FIGS. 1A–1C, an adapter 10 is shown to be comprised of a threaded end 12 and a female collar end 14. Eight threads are shown by way of example. The inner diameter 16 of adapter 10 may be 0.7500" with tolerances +0.005" −0.000".

The collar 14 is shown having two threaded holes for radially inserting two screws 50. As shown in FIGS. 1B and 1C, the collar 14 also possesses two axial holes 11 into which two pin dowels 40 may be inserted perpendicular to the axes of the screws 50, and parallel to the axis of the adapter 10. The collar 14 is shown having an outer diameter of 1.75", with the holes 11 of the pin dowels 40 being offset from a vertical axis 0.95" and offset by the horizontal axis 0.630". The collar 14 is shown having wrench lands 18.

Referring now to FIGS. 2A–D, the bushing 20 of an embodiment of the present invention is shown as having a threaded end 22 and a smooth male end 24. The threaded end 22 is shown having a 0.06"×45° chamfer 23. The smooth male end 24 is shown having a 0.02"×45° chamfer 25. The outer diameter 26 of smooth male end 24 is typically 0.7495" with tolerances of +0.0000, −0.005".

Also shown is the gasket slot 28, the groove 29, and the stop 27. The stop 27 may be hexagonal as shown, or may have a perimeter of any other shape.

Figure 3A:
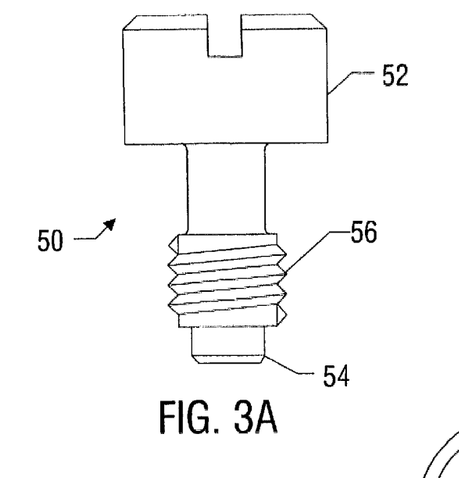
FIGS. 3A–C show the side, top, and perspective views of the screw of one embodiment of the present invention.
Figure 3B:
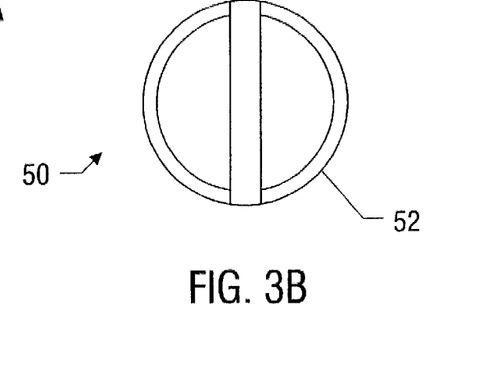
Figure 3C:
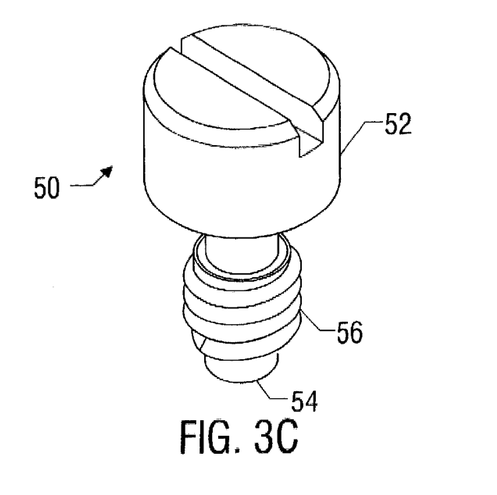

Referring to FIGS. 3A–C, a screw 50 is shown having a screw head 52, screw threads 56, and a screw tip 54. The screw 50 may be a standard shoulder screw, having 45° chamfers on a head 52 and a tip 54.

Figure 4A:
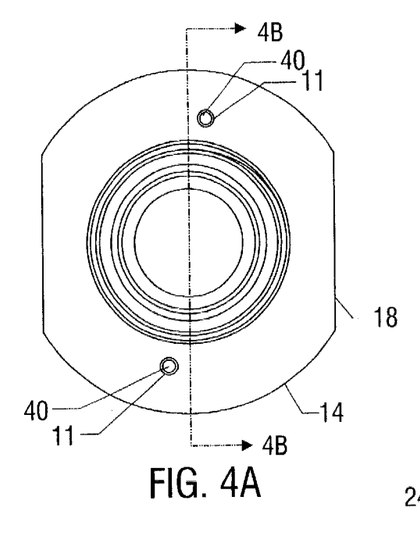
FIGS. 4A–D show the side, front, rear, and perspective views of the fitting of one embodiment of the present invention.
Figure 4B:
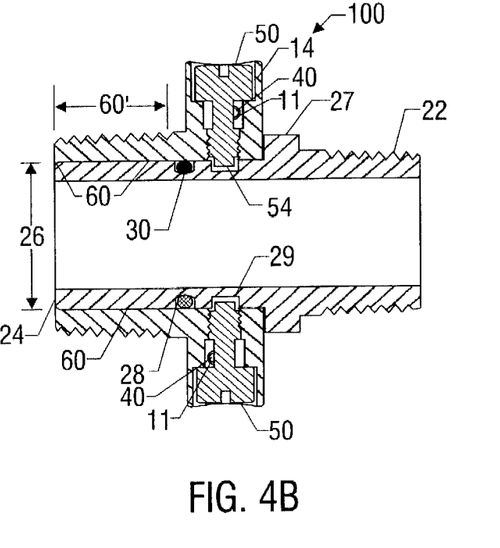
Figure 4C:
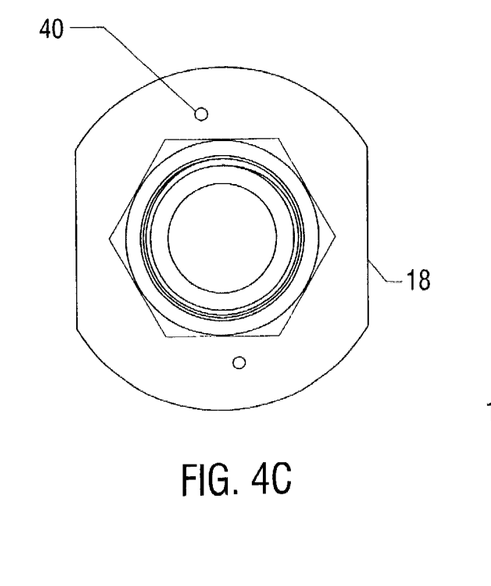
Figure 4D:
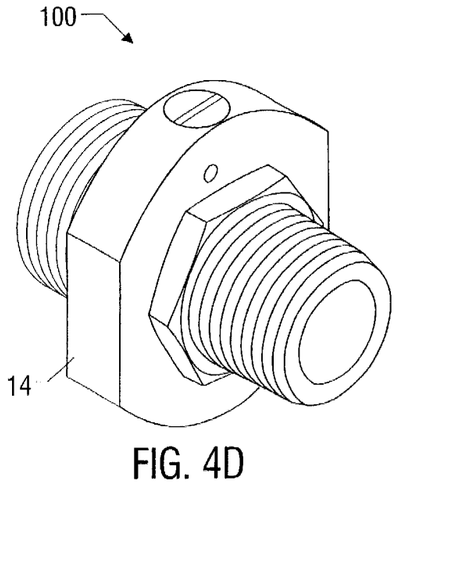

Referring to FIGS. 4A–4D, an embodiment of the present invention is shown in its assembled state. The fitting 100 is shown being comprised of the adapter 10 receiving the smooth male end 24 of the bushing 20. A locking mechanism is shown connecting the adapter 10 to the bushing 20 while the bushing 20 is inserted into the adapter 10 as shown in FIG. 4A. In this embodiment, the locking mechanism comprises a shoulder screw 50 being inserted into the threaded hole in the collar 14. The screw tip 54 aligns with a groove 29 in the bushing 20. In some embodiments, the screw tip 54 substantially minimizes axial movement of the bushing 20 relative to the adapter 10, but allows rotational movement between the busing 20 and the adapter 10. In some embodiments, the screw 50 is driven into the bushing 20 such that the threads 56 of the screw 50 contact the upper end of the groove 29 in the bushing 20. When the screw threads 56 contact the upper end of the groove 29, the bushing 20 and the adapter 10 are substantially prevented from moving both axially and rotationally relative to each other.

Figure 5A:
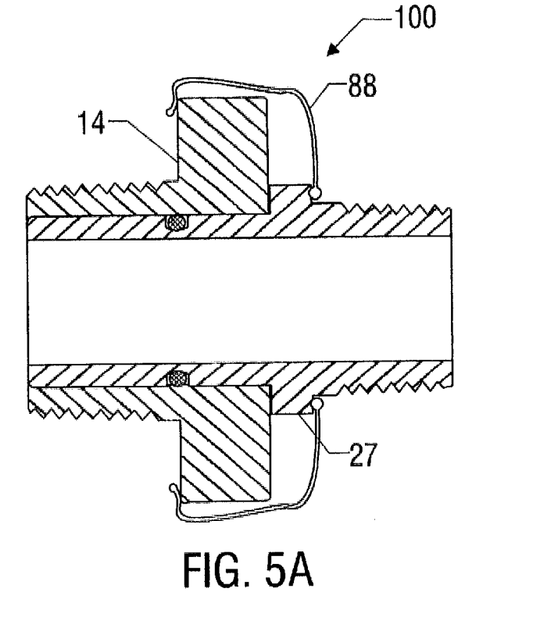
FIG. 5A shows an embodiment having a clip.
Figure 5B:
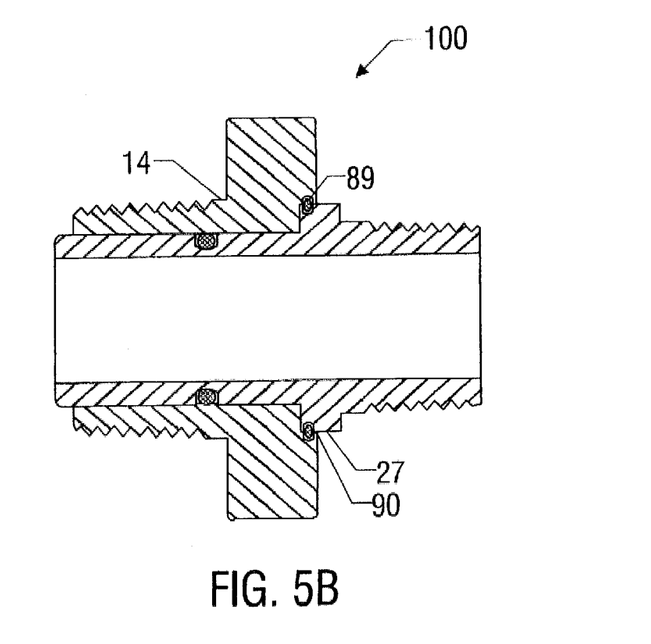
FIG. 5B shows an embodiment having metal ring.

In other embodiments, such as that shown in FIG. 5A, the locking mechanism may be composed of a clip 88 being pivotally connected to the collar 14 and contacting a stop 27 on the bushing 20, thus substantially reducing the axially movement of the bushing 20 relative to the adapter 10. By increasing the clamping force, rotational movement of the bushing 20 relative to the adapter 10 may also be substantially reduced. In some embodiments, such as the one shown in FIG. 5B, the locking mechanism may comprise a metal ring 89 connected to the perimeter of a stop 27. A lip having a groove 90 on a collar 14 of the adapter 10 can be forced to surround the metal ring 89. In this way, relative axial movement between busing 20 and adapter 10 is substantially reduced. However, relative rotational movement between the two is allowed.

Figure 6A:
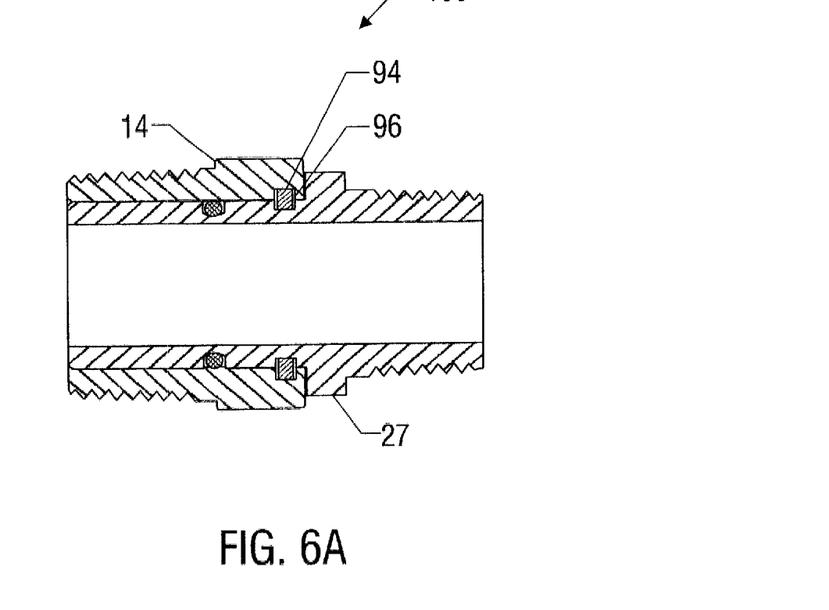
FIGS. 6A–6C show an embodiment having a C-clamp.
Figure 6B:
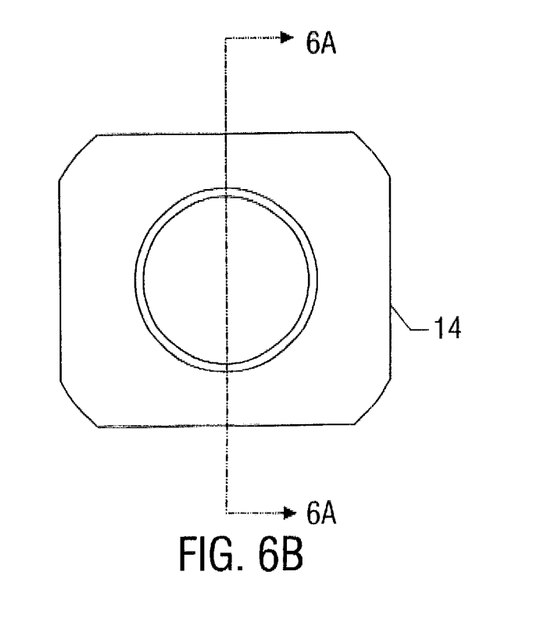
Figure 6C:
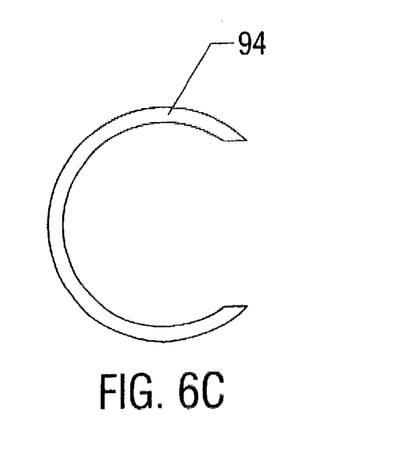

In some embodiments, such as the one shown in FIGS. 6A–6C, the locking mechanism may be comprised of C-clamp 94 being connected to the adapter 10, and lodging in a C-clamp groove 96 on the bushing 20 to connect the adapter 10 to the bushing 20 thus substantially reducing relative axial movement. By increasing the holding force of the C-clamp 94, rotational movement may also be substantially reduced.

In short, any number of locking mechanisms could be utilized to perform the locking functions previously described.

Returning to FIGS. 4A–D, the pin dowels 40 are shown to reside in the pin dowel holes 11 in the collar 14 such that the axis of the pin dowels 40 runs parallel to the axes of the bushing 20 and the adapter 10. The pin dowels 40 are located in close proximity to the screws 50 to prevent the screws 50 from becoming removed from the collar 14. As the screws 50 are unscrewed from the collar 14, the threads 56 will eventually contact the pin dowels 40 to prevent reduce further rotation of the screw 50 with respect to the collar 14. This prevents the screws 50 from becoming disassociated from the adapter 10.

Also shown in FIGS. 4A–D is a gasket 30 placed in a slot 28 in the bushing 20. The gasket 30 may be an O-ring for example, to produce a water-tight seal between the bushing 20 and the adapter 10. It should also be mentioned that the gasket 30 placed in the slot 28 may also act as the locking mechanism described above. Thus, the gasket could perform the locking function, and the sealing function.

Also shown in FIGS. 4A–4D is a stop 27 on the adapter 10. When the bushing 20 is inserted into the adapter 10 in its locked position, the collar end 14 of the adapter 10 abuts the stop 27 to further assist in retarding flames from escaping the fitting into the environment. In this embodiment, the stop 27 is shown to be hexagonally-shaped to facilitate the rotation of the bushing 20 (described herein) with a wrench.

When the smooth male end 24 of the bushing 20 is inserted into the adapter 10 as shown, the outer diameter 26 of the bushing 20 is in close communication with the inner diameter 16 of the adapter 10 to define a flame path 60. Typically, the flame path 60 has a length 60' that is 0.6" long as shown for this particular fitting 100. As previously stated, the inner diameter 16 is 0.7500" with tolerances of +0.0005" (0.5 mil.), −0.0000", and the outer diameter 26 is 0.7495" having tolerances of +0.0000, −0.0005" (0.5 mil) determining a maximum gap between inner diameter 16 and outer diameter 26 of 1.5 mil (0.0015"). For larger gaps between the inner diameter 16 and the outer diameter 26, the length 60' of flame path 60 along smooth male end 24 of bushing 20 should be increased to ensure fitting 100 remains explosion proof under UL 886. Any number of configurations are possible to produce an explosion proof fitting. Embodiments of the present invention are shown below:

TABLE 1

Possible Explosion Proof Configurations

| Flame Path | Clearance |
|---|---|
| 0.6" | 0.0015" |
| ¾" | 0.0020" |
| ⅞" | 0.0026" |
| 1" | 0.00328" |
| 1¼" | 0.0045" |

Figure 7A:
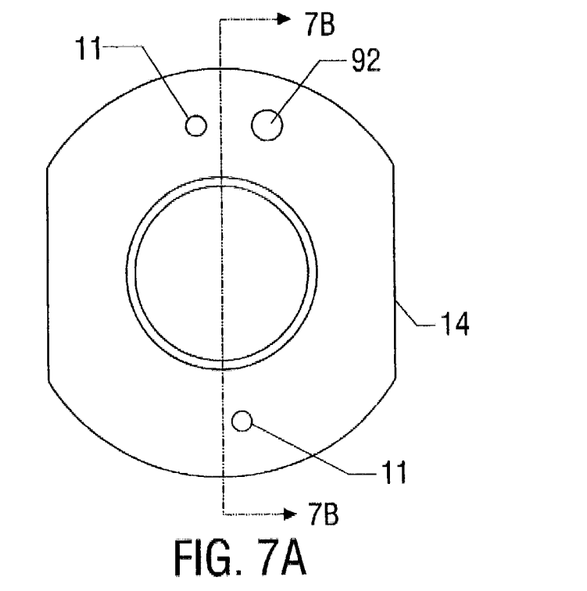
FIGS. 7A–7B show an embodiment having an annular access.
Figure 7B:
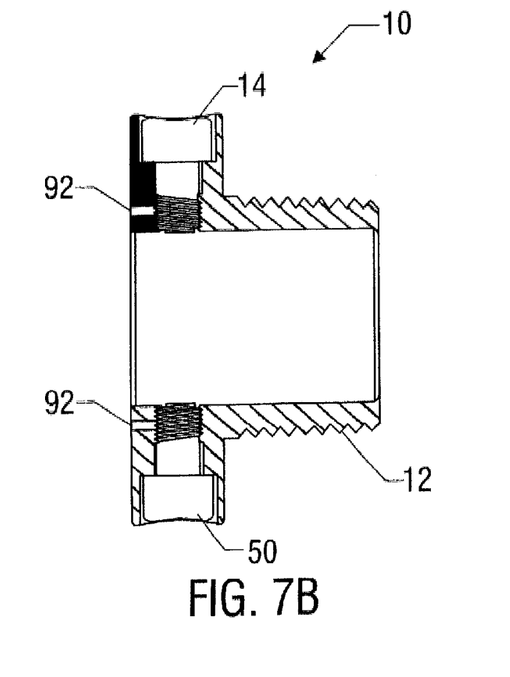

Although the fitting 100 is explosion proof without the use of damming material, in some embodiments, the collar 14 further comprises an annular access 92 for the insertion of the damming material, as shown in FIG. 7. The annular access 92 runs parallel to the pin dowel holes 11. By inserting the damming material into the annular access 92, the damming material passes around the threads 56 of the screw 50 and between the adapter 10 and the bushing 20, further preventing flames or sparks from escaping fitting 100. Further, annular access 92 could be placed in anywhere on the collar 14 to distribute damming material to a given location. For instance, annular access 92 could be on the collar 14 next to the location where the stop 27 of the bushing contacts the collar 14 when the adapter 10 and the bushing 20 are connected. In this way, damming material could be inserted into the areas between the adapter and the bushing.

Figure 8A:
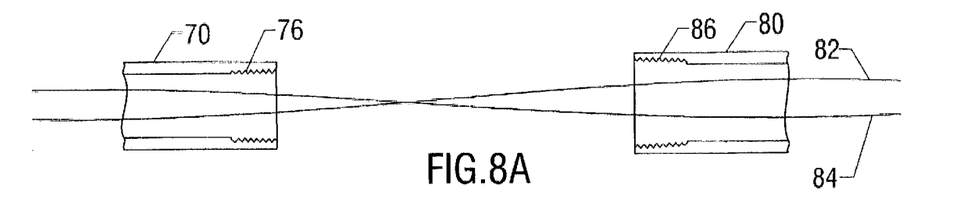
FIGS. 8A–8C show an embodiment being connected to two components.
Figure 8B:
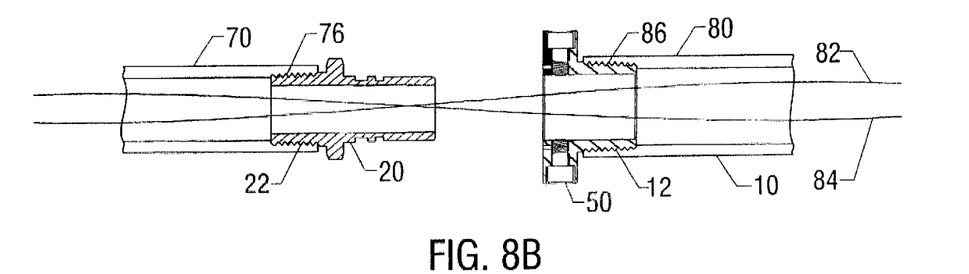
Figure 8C:
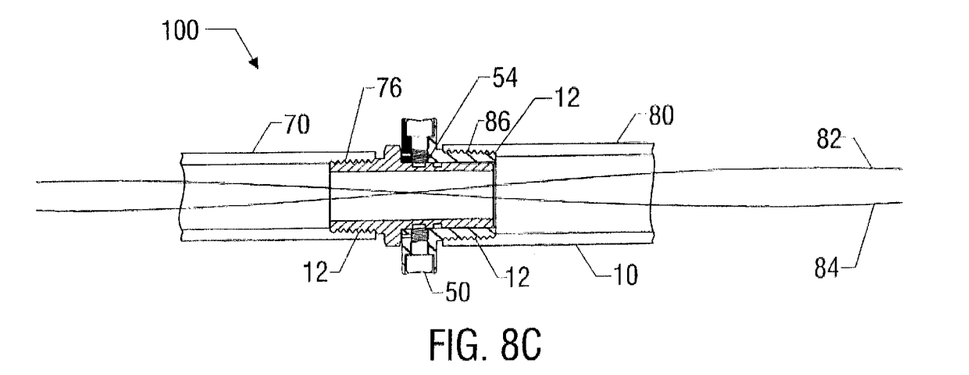

Referring to FIGS. 8A–8C, an installation of one embodiment of the present invention is progressively shown. FIG. 8A shows electrical wires 82 and 84 running through a first component (here, electrical conduit 70 for example) having a threaded end 76. Electrical wires 82 and 84 are also shown running through a second component (here, electrical conduit 80, for example). FIG. 8B shows the threaded end 22 of the bushing 20 threadedly engaging the threaded end 76 of the first component 70, an electrical conduit. The threaded end 12 of the adapter 10 is shown threadedly engaging the threaded end 86 of the second component 80, an electrical conduit. Five to seven turns of engagement are generally required to meet explosion proof connection specification such as UL 886.

FIG. 8C shows the adapter 10 receiving the smooth male end 24 of the bushing 20. Once the smooth male end 24 is completely inserted into the adapter 10, the screws 50 in the collar 14 are tightened such that the screw tips 54 contact the groove 29 in the bushing 20 to reduce axial movement between the bushing 20 and the adapter 10.

It should be noted that the locking mechanism allows rotation, but substantially reduces axial movement, between the bushing 20 and the adapter 10 in some embodiments. Thus, it will be appreciated that this allowed rotational movement also allows the adapter 10 and the bushing 20 to be rotated about components that are incapable of rotating, i.e. fixed. A wrench may be placed on the wrench lands 18 of the collar 14 on the adapter 10 to rotate the adapter 10 about the second component 80 for threaded engagement therewith. Further, a wrench may be placed on the hexagonal stop 27 to rotate the bushing 20 for threaded engagement with the first component 70. In this way, insertion of fitting 100 into an electrical system is facilitated.

This ease of assembly allows for quick and easy installation and removal of a fitting to connect two components, while still providing an explosion proof fitting.

Although the components are shown to be electrical conduits in some embodiments, the components could comprise electrical boxes, solenoids, or any other types of components. Further, although the conduits 80 and 90 are shown as having external threads, and fitting 100 is shown having internal threads, fitting 100 could have external threads on either end mating with components 80 or 90 having internal threads.

Further, although the diameter of components 80 or 90 shown are different, fitting 100 could be constructed such that outside diameter of threaded end 22 of bushing 26 were identical, smaller than, or larger than, the outside diameter of threaded end 12 of adapter 10.

The explosion proof fitting previously described also could be utilized to place one component or conduit in fluid communication with another conduit thus allowing explosive gasses to flow from one component or conduit to another. The explosion proof nature of the fitting would safely allow the flow of hazardous liquids or gases through a pipeline, for example.

Although various embodiments have been shown and described, the invention is not so limited and will be understood to include all such modifications and variations as would be apparent to one skilled in the art.

What is claimed is:

1. A fitting for connecting a first component to a second component, the fitting comprising:
    a bushing having a threaded end for threadedly engaging the first component, and a smooth male end having an outer diameter;
    an adapter having a threaded end for threadedly engaging the second component, and a female collar end having a collar, the adapter having an inside diameter, the adapter receiving the smooth male end of the bushing;
    a locking mechanism to connect the adapter to the bushing when the smooth male end of the bushing is inserted into the adapter,
    the locking mechanism having a groove being formed along an outer perimeter of the bushing and a screw having a tip, the screw being radially inserted through the collar of the adapter, the tip of the screw mating with the groove of the bushing to allow the adapter to rotate about the bushing; and
    a pin dowel, the pin dowel being inserted into the collar perpendicular to an axis of the screw, the pin dowel preventing the tip of the screw from becoming unmated with the groove, the outer diameter of the bushing being in close communication with the inner diameter of the adapter to define a flame path to produce an explosion proof fitting.

2. The fitting of claim 1 in which the tip of the screw is screwed into to the groove to rigidly attach the adapter to the bushing.

3. The fitting of claim 1 in which the locking mechanism further comprises a C-clamp being connected to the collar end of the adapter and being clamped around the bushing to axially affix the adapter to the bushing.

4. The fitting of claim 1 in which the locking mechanism further comprises a gasket, the gasket being inserted into the groove being formed along an outer perimeter of the bushing.

5. The fitting of claim 1 further comprising a gasket to provide a water-tight fitting, the gasket being inserted into a slot along an outer perimeter of the bushing.

6. The fitting of claim 5 in which the gasket is an O-ring.

7. The fitting of claim 1 in which the flame path is 0.6" along an axial length of the fitting.

8. The fitting of claim 1 in which the bushing further comprises a stop to abut the collar of the adapter when the smooth male end of the bushing is inserted into the adapter.

9. The fitting of claim 8 in which the stop further comprises a hexagonal perimeter to allow a wrench to tighten the fitting on the first component.

10. The fitting of claim 1 in which the threaded end of the adapter further comprises a chamfer.

11. The fitting of claim 1 in which the threaded end of the bushing further comprises a chamfer.

12. The fitting of claim 1 in which the collar further comprises a wrench land to allow a tool to tighten the fitting on the second component.

13. The fitting of claim 1 in which the collar further comprises an annular access to place an inside diameter of the collar in fluid communication with an outside diameter of the collar to insert damming material into the annular access to further seal the fitting.

14. A fitting for connecting a first component to a second component, the fitting comprising:
    a bushing having a threaded end for threadedly engaging the first component, and a smooth male end having an outer diameter;
    an adapter having a threaded end for threadedly engaging the second component, and a female collar end having a collar, the adapter having an inside diameter, the adapter receiving the smooth male end of the bushing; and
    a locking mechanism to connect the adapter to the bushing when the smooth male end of the bushing is inserted into the adapter,
    the locking mechanism having a clip, the clip being connected to the collar of the adapter to connect the adapter to a stop on the bushing,
    the outer diameter of the bushing being in close communication with the inner diameter of the adapter to define a flame path to produce an explosion proof fitting.

15. The fitting of claim 14 further comprising a gasket to provide a water-tight fitting, the gasket being inserted into a slot along an outer perimeter of the bushing.

16. The fitting of claim 15 in which the gasket is an O-ring.

17. The fitting of claim 14 in which the flame path is 0.6" along an axial length of the fitting.

18. The fitting of claim 14 in which the bushing further comprises a stop to abut the collar of the adapter when the smooth male end of the bushing is inserted into the adapter.

19. The fitting of claim 18 in which the stop further comprises a hexagonal perimeter to allow a wrench to tighten the fitting on the first component.

20. The fitting of claim 14 in which the threaded end of the adapter further comprises a chamfer.

21. The fitting of claim 14 in which the threaded end of the bushing further comprises a chamfer.

22. The fitting of claim 14 in which the collar further comprises a wrench land to allow a tool to tighten the fitting on the second component.

23. The fitting of claim 14 in which the collar further comprises an annular access to place an inside diameter of the collar in fluid communication with an outside diameter of the collar to insert damming material into the annular access to further seal the fitting.

24. A fitting for connecting a first component to a second component, the fitting comprising:
    a bushing having a threaded end for threadedly engaging the first component, and a smooth male end having an outer diameter;

an adapter having a threaded end for threadedly engaging the second component, and a female collar end having a collar, the adapter having an inside diameter, the adapter receiving the smooth male end of the bushing; and a locking mechanism to connect the adapter to the bushing when the smooth male end of the bushing is inserted into the adapter, the locking mechanism having a C-clamp, the C-clamp being inserted into a gap formed by an internal groove on an inner diameter of the collar mating with a groove formed along an outer perimeter of the bushing, the outer diameter of the bushing being in close communication with the inner diameter of the adapter to define a flame path to produce an explosion proof fitting.

25. The fitting of claim 24 further comprising a gasket to provide a water-tight fitting, the gasket being inserted into a slot along an outer perimeter of the bushing.

26. The fitting of claim 25 in which the gasket is an O-ring.

27. The fitting of claim 24 in which the flame path is 0.6" along an axial length of the fitting.

28. The fitting of claim 24 in which the bushing further comprises a stop to abut the collar of the adapter when the smooth male end of the bushing is inserted into the adapter.

29. The fitting of claim 28 in which the stop further comprises a hexagonal perimeter to allow a wrench to tighten the fitting on the first component.

30. The fitting of claim 24 in which the threaded end of the adapter further comprises a chamfer.

31. The fitting of claim 24 in which the threaded end of the bushing further comprises a chamfer.

32. The fitting of claim 24 in which the collar further comprises a wrench land to allow a tool to tighten the fitting on the second component.

33. The fitting of claim 24 in which the collar further comprises an annular access to place an inside diameter of the collar in fluid communication with an outside diameter of the collar to insert damming material into the annular access to further seal the fitting.

34. A fitting for connecting a first component to a second component, the fitting comprising:

a bushing having a threaded end for threadedly engaging the first component, and a smooth male end having an outer diameter;

an adapter having a threaded end for threadedly engaging the second component, and a female collar end having a collar, the adapter having an inside diameter, the adapter receiving the smooth male end of the bushing; and a locking mechanism to connect the adapter to the bushing when the smooth male end of the bushing is inserted into the adapter, the locking mechanism having a metal ring, the metal ring being attached to a perimeter of a stop on the bushing, the collar of the adapter having a groove formed along an inner perimeter to connect to the metal ring, the outer diameter of the bushing being in close communication with the inner diameter of the adapter to define a flame path to produce an explosion proof fitting.

35. The fitting of claim 34 further comprising a gasket to provide a water-tight fitting, the gasket being inserted into a slot along an outer perimeter of the bushing.

36. The fitting of claim 35 in which the gasket is an O-ring.

37. The fitting of claim 34 in which the flame path is 0.6" along an axial length of the fitting.

38. The fitting of claim 34 in which the bushing further comprises a stop to abut the collar of the adapter when the smooth male end of the bushing is inserted into the adapter.

39. The fitting of claim 38 in which the stop further comprises a hexagonal perimeter to allow a wrench to tighten the fitting on the first component.

40. The fitting of claim 34 in which the threaded end of the adapter further comprises a chamfer.

41. The fitting of claim 34 in which the threaded end of the bushing further comprises a chamfer.

42. The fitting of claim 34 in which the collar further comprises a wrench land to allow a tool to tighten the fitting on the second component.

43. The fitting of claim 34 in which the collar further comprises an annular access to place an inside diameter of the collar in fluid communication with an outside diameter of the collar to insert damming material into the annular access to further seal the fitting.

44. A method of connecting a first component to a second component, the method comprising:

providing a fitting for connecting a first component to a second component, the fitting having a bushing having a threaded end for threadedly engaging the first component, and a smooth male end having an outer diameter, an adapter having a threaded end for threadedly engaging the second component, and a female collar end having a collar, the adapter having an inside diameter, the adapter receiving the smooth male end of the bushing, a locking mechanism to connect the adapter to the bushing when the smooth male end of the bushing is inserted into the adapter, the locking mechanism having a groove being formed along an outer perimeter of the bushing and a screw having a tip, the screw being radially inserted through the collar of the adapter, the tip of the screw mating with the groove of the bushing to allow the adapter to rotate about the bushing, and a pin dowel, the pin dowel being inserted into the collar perpendicular to an axis of the screw, the pin dowel preventing the tip of the screw from becoming unmated with the groove, the outer diameter of the bushing being in close communication with the inner diameter of the adapter to define a flame path to produce an explosion proof fitting;

rotating the bushing to threadedly engage the fitting to the first component; and rotating the adapter to threadedly engage the fitting to the second component.

45. The method of claim 44 further comprising:

inserting the screw radially through the collar of the adapter; and making the tip of the screw with the groove of the bushing to allow the adapter to rotate about the bushing.

46. An explosion proof fitting for connecting a first electrical conduit to a second electrical conduit, the fitting comprising:

a bushing having a threaded end for threadedly engaging the first electrical conduit, and a smooth male end having an outer diameter;

an adapter having a threaded end for threadedly engaging the second electrical conduit, and a female collar end, the adapter having an inside diameter, the adapter receiving the smooth male end of the bushing;

a locking mechanism to connect the adapter to the bushing when the smooth male end of the bushing is inserted into the adapter, the locking mechanism having a groove being formed along an outer perimeter of the bushing and a screw having a tip, the screw being radially inserted through the collar of the adapter, the tip of the screw mating with the groove of the bushing to allow the adapter to rotate about the bushing, the outer diameter of the bushing being in close communication with the inner diameter of the adapter to define a flame path to produce an explosion proof fitting, the flame path having a length 0.6" along an axial length of the fitting, the bushing having a stop to abut the collar of the adapter when the smooth male end of the bushing is inserted into the adapter, the stop having a hexagonal perimeter to allow a wrench to tighten the fitting on the first component;

a pin dowel, the pin dowel being inserted into the collar perpendicular to an axis of the screw, the pin dowel preventing the tip of the screw from becoming unmated with the groove; and an O-ring to provide a water-tight fitting, the O-ring being inserted into a slot along an outer perimeter of the bushing, the threaded end of the adapter having a first chamfer, the threaded end of the bushing having a second chamfer, the collar having a wrench land to allow a tool to tighten the fitting on the second component, the collar having an annular access to place an inside diameter of the collar in fluid communication with an outside diameter of the collar to insert damming material into the annular access to further seal the fitting.

* * * * *